United States Patent [19]

Tweedie et al.

[11] Patent Number: 6,068,725
[45] Date of Patent: May 30, 2000

[54] METHOD OF INSTALLATION OF A FLEXIBLE CURED IN PLACE LATERAL SEAL IN AN EXISTING MAIN PIPELINE

[75] Inventors: John Tweedie, St. Peters, Mo.; Philip M. Smith, Fort Worth, Tex.; Jeff P. Wells, Chesterfield; Kerry D. Severs, St. Peters, both of Mo.; Kevin P. Murray, Schaumburg, Ill.

[73] Assignee: Insituform (Netherlands) B.V., Netherlands

[21] Appl. No.: 08/978,740

[22] Filed: Nov. 26, 1997

[51] Int. Cl.⁷ .......................... F16L 55/1645; F16L 55/18
[52] U.S. Cl. .......................... 156/287; 156/294; 156/423; 264/269; 138/97; 138/98
[58] Field of Search ................................. 156/287, 294, 156/423; 264/269; 138/97, 98

[56] References Cited

U.S. PATENT DOCUMENTS

| | | |
|---|---|---|
| 2,944,994 | 7/1960 | Singleton et al. . |
| 3,804,663 | 4/1974 | Clark . |
| 4,009,063 | 2/1977 | Wood . |
| 4,135,958 | 1/1979 | Wood . |
| 4,425,287 | 1/1984 | Hesse et al. . |
| 4,434,115 | 2/1984 | Chick . |
| 4,439,469 | 3/1984 | Wood . |
| 4,581,247 | 4/1986 | Wood . |
| 4,680,066 | 7/1987 | Wood . |
| 4,687,677 | 8/1987 | Jonasson ........................... 156/272.2 X |
| 4,991,006 | 2/1991 | Wood . |
| 5,018,545 | 5/1991 | Wells . |
| 5,329,063 | 7/1994 | Endoh . |
| 5,340,160 | 8/1994 | Meijers et al. . |
| 5,393,481 | 2/1995 | Wood . |
| 5,395,862 | 3/1995 | Neckers et al. . |
| 5,423,630 | 6/1995 | Imoto et al. ........................... 138/97 X |
| 5,451,343 | 9/1995 | Neckers et al. . |
| 5,514,519 | 5/1996 | Neckers et al. . |
| 5,606,171 | 2/1997 | Neckers et al. . |
| 5,609,439 | 3/1997 | Schreiner et al. ...................... 156/156 |
| 5,623,080 | 4/1997 | Neckers et al. . |
| 5,624,629 | 4/1997 | Wood . |
| 5,639,802 | 6/1997 | Neckers et al. . |
| 5,692,543 | 12/1997 | Wood . |

FOREIGN PATENT DOCUMENTS

| | | |
|---|---|---|
| 0 025 359 | 9/1979 | European Pat. Off. . |
| 0 039 838 | 11/1981 | European Pat. Off. . |
| 0 518 521 A2 | 12/1992 | European Pat. Off. . |
| 39 29 558 A1 | 3/1991 | Germany . |
| 40 31 949 A1 | 4/1992 | Germany . |
| 4207038 | 9/1993 | Germany . |
| 2 041 147 | 9/1980 | United Kingdom . |
| WO 91/07619 | 5/1991 | WIPO . |
| WO 91/16568 | 10/1991 | WIPO . |
| WO 95/08737 | 3/1995 | WIPO . |

*Primary Examiner*—Jeff H. Aftergut
*Attorney, Agent, or Firm*—Cowan, Liebowitz & Latman, P.C.; Michael I. Wolfson; Lloyd G. Buchanan

[57] ABSTRACT

A method for installing and curing a cured in place lateral seal at the connection between a main pipeline and a lateral connection is provided. The method includes placing a resin impregnated lateral seal in the form of a top hat with a brim portion and short tubular portion onto a cylindrical flexible bladder cartridge having a tubular recess for receiving the tubular portion of the seal with the brim portion along the outer portion of the bladder, placing an assembly carrying the bladder to the location of the lateral and pressing the brim portion of the seal against the interior of the main pipeline and everting the tubular portion out of the tubular recess into a portion of the lateral to form the seal. Radiant energy, preferably, light is then applied to the resin to initiate the cure, the bladder is cooled and then deflated. A rapid cure using a light curable resin and exchanged of loaded cartridges allows installation of a number of laterals in the time it usually takes to cure a lining in a pipeline by use of heat alone.

8 Claims, 4 Drawing Sheets

METHOD OF INSTALLATION OF A FLEXIBLE CURED IN PLACE LATERAL SEAL IN AN EXISTING MAIN PIPELINE

BACKGROUND OF THE INVENTION

This invention relates to a method of installation of a flexible lateral seal which is impregnated with a curable resin, and more particularly more to a method of installing a seal by initiating the cure by transmission of radiant energy through a silicone bladder used to insert the seal at the intersection between a main pipeline and intersecting lateral pipeline.

The most widely practiced method of lining existing pipelines and conduits using a flexible resin impregnated lining or "cured in place pipe" is the Instituform® Process and is described in U.S. Pat. Nos. 4,009,063 and 4,064,211, the contents of which are incorporated herein by reference. Briefly, in the Insituform® Process, an elongated flexible tubular lining of a resin impregnable material, such as a needled felt, which has been impregnated with a thermosetting synthetic resin, is installed within an existing pipeline that is in need of repair. The impregnated liner may be pulled into the conduit by a rope or cable, and a fluid-impermeable inflation bladder or tube is then everted within the liner as described in detail in U.S. Pat. No. 4,009,063. Alternately, the liner is installed utilizing an eversion process as described in U.S. Pat. No. 4,064,211. The liners utilized in the Insituform® Process are flexible and generally have a smooth impermeable coating on one side. After inversion, this smooth layer becomes the inside of the liner.

After the flexible liner is positioned within the conduit, the liner is pressurized from within, preferably using a fluid such as water. The fluid pressure forces the liner radially outwardly to engage and conform to the interior surface of the existing pipeline. The resin is then cured by recirculating heated water to form a relatively hard, tight-fitting rigid pipe lining that effectively relines the existing pipeline. In addition to curing by heat, the resin can be cured using other forms of radiant energy, such as ultra violet light as described in U.S. Pat. No. 4,135,958 or visible light in U.S. Pat. Nos. 4,518,247 and 4,680,066, the contents of which are incorporated herein by reference. Alternatively, radiant energy in the form of electrical energy or sound waves can be used to initiate the cure. Once the liner is completely cured, lateral connections are cut to existing services to the liner by remote cutters, which are common expedients in the art.

There is a strong demand and a need to seal the connections between the main conduit and any lateral pipes, in addition to the repair of the main pipeline. This is an important consideration in the process of relining an entire existing sewer system in order to effectively prevent the ingress of ground water into the system and outflow of effluent from the system.

In a typical municipal sewer system, there are a plurality of lateral pipeline entering a main conduit between adjacent manhole access points. The time needed to cure a cured in place liner that has been installed in a main pipeline is typically between four and six hours. Using existing methods of lining or lateral pipelines or is not possible to perform any significant repair or lining operations of the plurality of lateral connections at the same time that a main conduit is being lined. Repair or sealing of each lateral connection using conventional lining methods is difficult. Such long cure times would generally increase the amount of time required to complete the repair of a particular line by almost a full day of work for each lateral connection. Since a typical residential street may have about ten or more homes between manholes, this would increase the operating time needed to complete the lining operation for repair of the main pipeline between adjacent manholes from one day to ten days or more.

There are presently several proposals available for lining lateral pipelines and forming a seal at the lateral connection. Some of these call for lining the lateral from the outlet of the service lateral inward to the mainline conduit. One such method is described in U.S. Pat. No. 5,108,533. Others utilize a launcher-type apparatus that inserts a lining from the main pipeline into the lateral connection at a location remote from the access to the main pipeline. This process is described in U.S. Pat. No. 5,624,629, the contents of which are incorporated herein by reference. Here, a second or subsequent lateral is lined and cured, at the same time as an initial lateral is being lined in an effort to reduce the overall time of repair of the system. However, because several laterals are typically connected to a particular mainline conduit, it is difficult and almost physically impossible to install lateral seals at more than one location within a mainline conduit at the same time.

Accordingly, it is desirable to provide a method for installation of a flexible cured in place lateral seal which has been impregnated with a curable resin efficiently from an apparatus used to place the seal in the mainline at the intersection with a lateral pipeline.

SUMMARY OF THE INVENTION

Generally speaking, in accordance with the invention, a method for installing and curing a cured in place flexible lateral seal at the intersection between a main pipeline and a connecting lateral pipeline is provided. The seal has a brim portion bonded to a short tubular portion and is installed at a remote location in the mainline. The method includes placing a resin impregnated flexible lateral seal onto a cylindrical flexible bladder having a tubular recess for receiving the tubular portion of the seal with the brim portion along the outer portion of the bladder, inflating the bladder to press the brim portion of the seal against the interior of the main pipeline and everting the tubular portion out of the tubular recess into a portion of the lateral to form the lateral seal, applying energy generated within the bladder in the form of suitable radiation, such as heat, radiation, UV or infrared light, microwaves or electrically heating with heating wires in the seal or bladder, sound waves or a self-curing resin.

In a preferred embodiment, the bladder is formed of a flexible visible light transmissive material and is secured to a cylindrical hollow frame including visible lights suitable to initiate the cure. The flexible seal is formed utilizing a visible light transmissive fibrous material to insure deep curing depths and a faster cure.

Accordingly, it is an object of the invention to provide an improved method for installing a flexible cured in place lateral seal into the junction between a main pipeline and lateral connection from inside the main pipeline.

Another object of the invention is to provide a method for installing a flexible cured in place lateral seal using radiant energy to cure the resin.

A further object of the invention is to provide an improved method for installation of a flexible cured in place lateral seal wherein the resin is cured by light energy.

Still another object of the invention is to provide an improved method of installation of a cured in place lateral seal wherein the resin is cured by visible light with the light source contained within a transparent flexible bladder utilized to install the seal in the mainline at the lateral connection.

Still other objects and advantages of the invention will in part be obvious and will in part be apparent from the specification.

The invention accordingly comprises the several steps and the relation of one or more of such steps with respect to each of the others, the apparatus embodying features of construction, combination(s) and arrangement of parts which are adapted to effect such steps, and the article which possesses the characteristics, properties and relation of elements, all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENT

Figure 1:
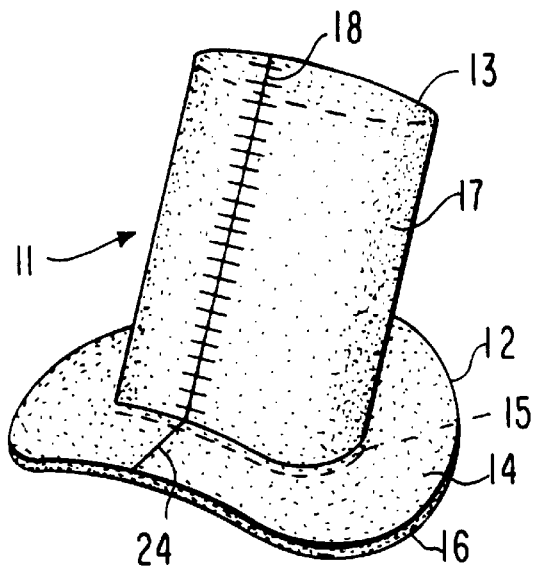
FIG. 1 is a perspective view of a flexible cured in place resin impregnable lateral seal including a brim portion bonded to a short tubular portion to be installed in accordance with the invention.
Figure 2:
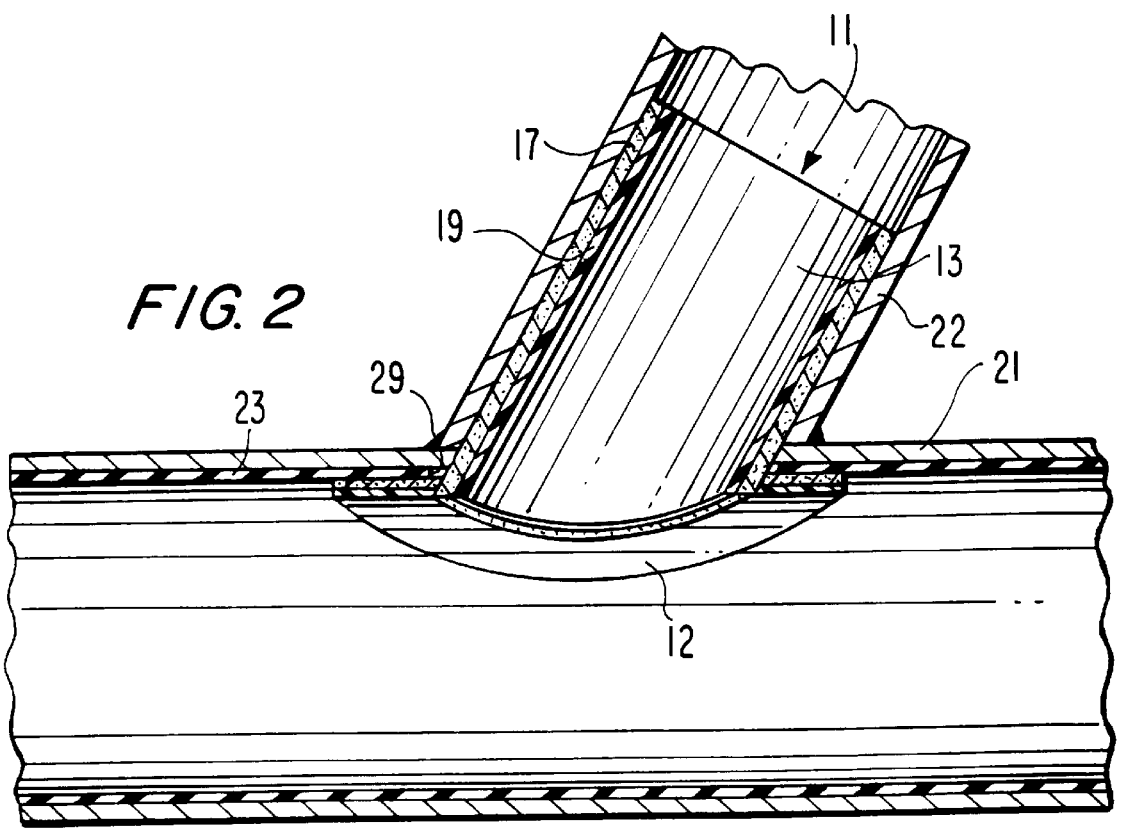
FIG. 2 is cross-sectional view showing the position of the lateral seal of FIG. 1 after installation in accordance with the invention.

FIG. 1 illustrates a cured in place lateral seal 11 to be installed at the intersection between an existing main pipeline 21 and a lateral pipeline 22 as shown in FIG. 2. In this particular case, main pipeline 21 has previously been lined with a cured in place lining 23 utilizing the Insituform Process. It is possible to utilize the apparatus for installing seal 11 to seal the connection in a main pipeline which has not been relined. Alternatively, main pipeline 21 may have been lined utilizing other trenchless technology processes, commonly referred to as fold and formed, diameter reduction, or slip lining and the like.

Referring specifically to FIG. 1, seal 11 includes a substantially flat brim 12 bonded to a relatively short tubular section 13. Brim 12 is formed of a resin impregnable layer 14 and an impermeable layer 16 bonded thereto. Tubular portion 13 is bonded to brim 12 by a compatible adhesive, a hot melt material or flame bonding at a bond line 15.

Tubular portion 13 is formed from a substantially planar piece of resin impregnable lining material 17 coated on one side with an impermeable layer 19 which has been joined together edge to edge in a butt seam relationship with a row of stitches 18 to hold the edges together. A band of impermeable material in the form of a tape or quantity of an extruded material is placed over stitches 18 to maintain the impermeable characteristics of impermeable layer 19.

Brim 12 formed from a substantially planar resin impregnable material 14 is also coated on one side with an impermeable layer 16 dimensioned to conform to the opening between lateral 22 and main pipeline 21. Typically lateral 22 may intersect main pipeline 21 at a 60° angle as illustrated in the completed installation in FIG. 2. However, laterals may be found to intersect a main pipeline at angles of 45° and/or 90°. In these cases, the opening between the lateral and mainline will vary, depending on the angle and relative size of the pipelines. This can be determined during the prepatory inspection and video steps in the rehabilitation so that custom made lateral seals 11 can be fabricated as needed. A guide line 24 is provided on impregnable layer 14 of brim 12 to aid in the installation as will be described in more detail below.

Figure 3:
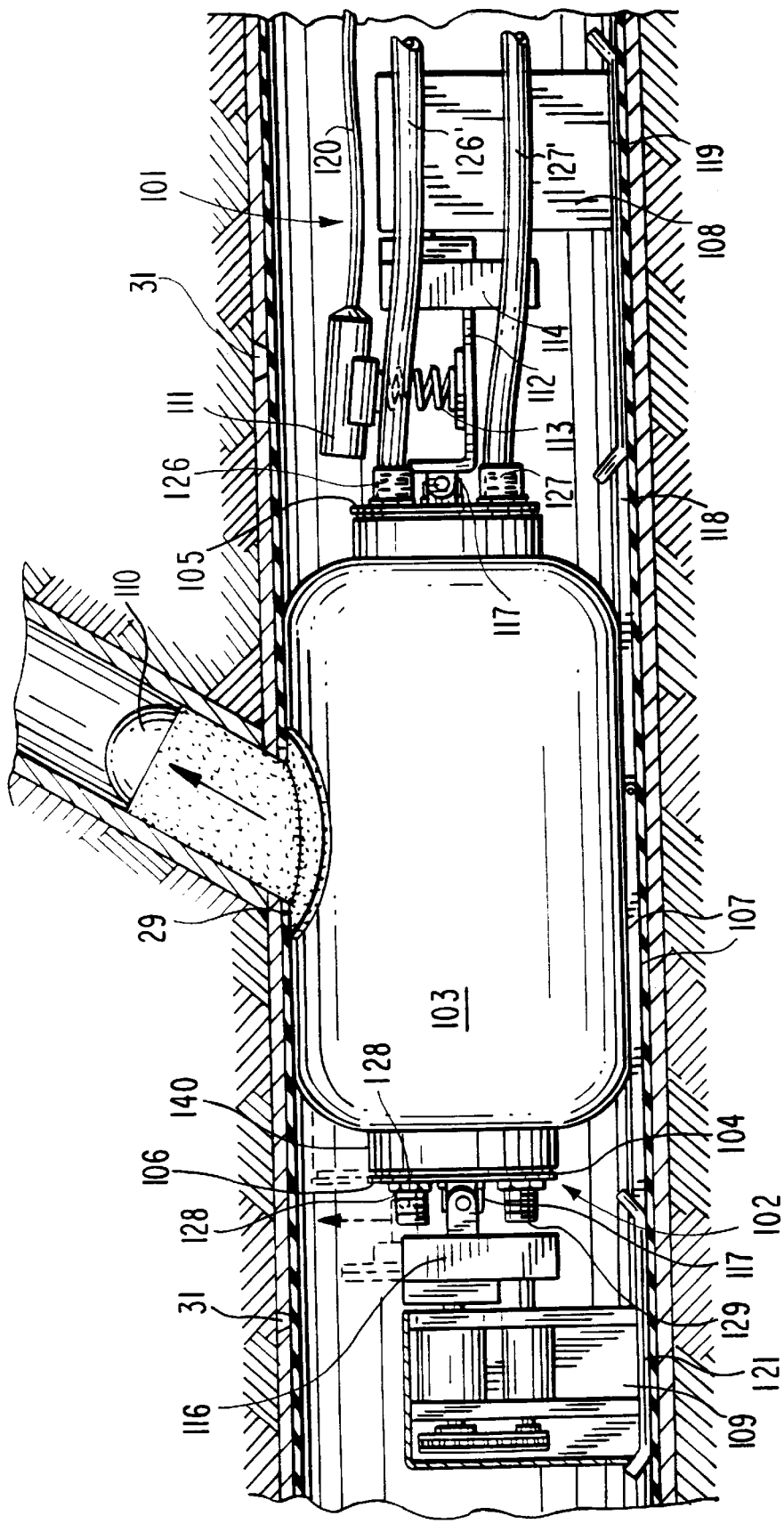
FIG. 3 is an elevational view of an apparatus for the installation of a lateral seal of FIG. 1 from the main line in accordance with the invention.
Figure 5:
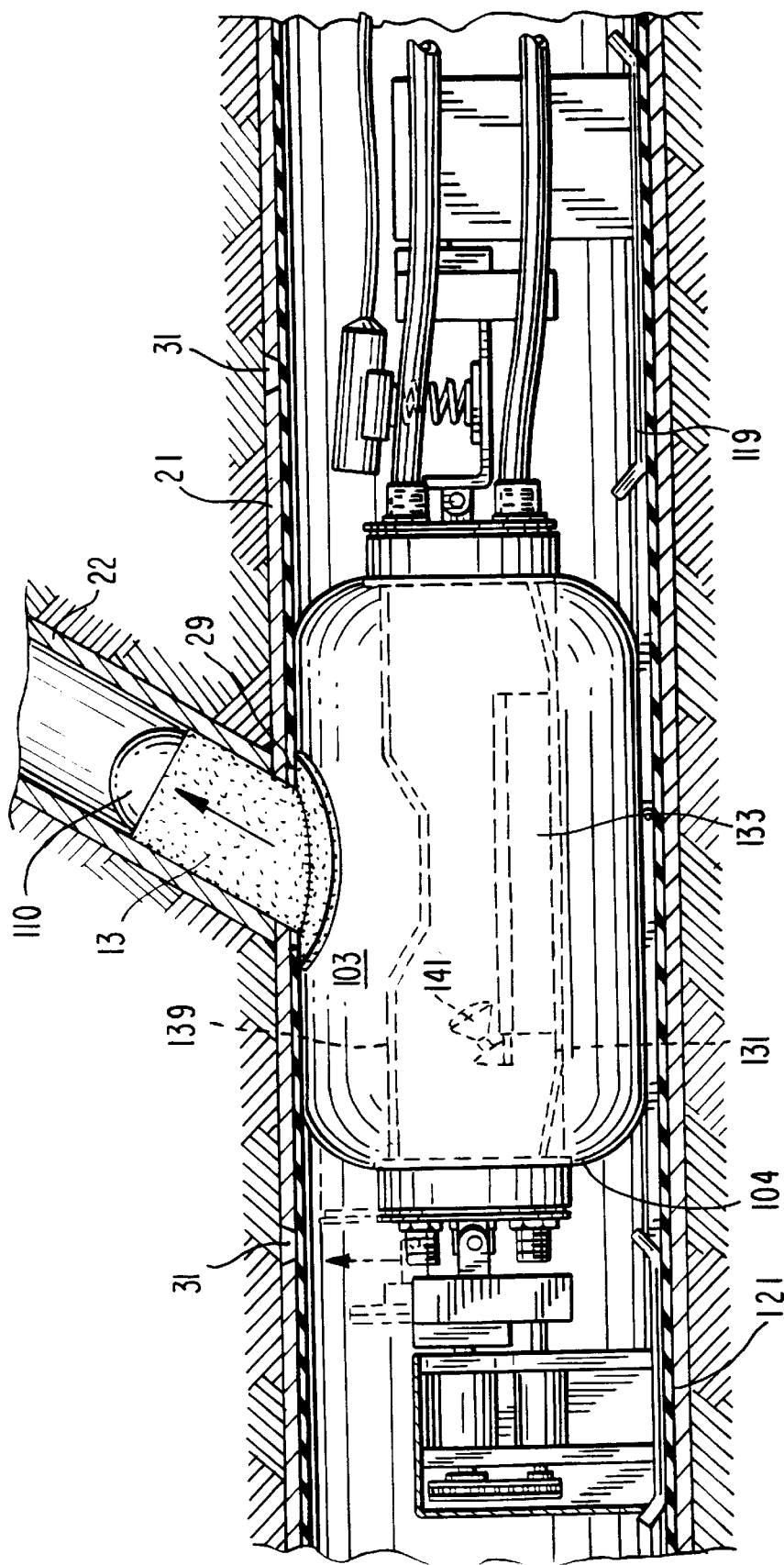
FIG. 5 is a cross-sectional view of the apparatus of FIG. 3 during the method of installation utilizing visible light to cure the resin.

When a light cure resin is used to impregnate seal 11, lamps emitting visible light having a wave length in the range of about 300 to 500 nanometers are mounted within a bladder cartridge 102 shown in FIGS. 3 and 5. Resin impregnable material 16 and 18 is typically an acrylic or polypropylene felt or a glass fibrous matte which will transmit the visible light when impregnated with a modified polyester or epoxy to yield a resin which is light curable as discussed in U.S. Pat. No. 4,581,247, the contents of which are incorporated herein by reference.

Resin 34 is a composition of a free radical light cureable resin admixed with an effective amount of a visible light, photo-bleaching initiator system and optionally performance enhancing fillers which can be impregnated into resin impregnable layers 17 and 22 and subsequently cured to a suitable depth. The resin can be selected from oligoeters of mono-ethylenically unsaturated urethanes, epoxies, polyesters and acrylics.

In the preferred embodiments of the invention, the resin is an epoxy acrylate resin which is a diglycydyl ether of bisphenol A which has been esterified with acrylic acid or methacrylic acid and which may include an ethylenically mono-unsaturated compound as a viscosity modifier admixed with an effective amount of a photo-bleaching visible light initiator system. The photo-bleaching bleaching initiator system includes a visible light sensitizer which is a fluorone derivative admixed with a hydrogen donor compound.

The visible light curable sensitizer compound includes a fluorone derived material. The fluorone derivative visible light sensitizer compound has the general formula

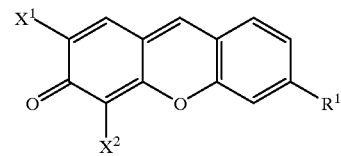

wherein in $R^1$ is hydrogen, $C_1$–$C_8$ alkyl, acyl and $X^1$ is a hydrogen atom or a halogen atom and $X^2$ is a hydrogen atom or the same or different halogen atom, a benzoyl group, a group of the formula—$L(C_2)_n{}^2$ where n is 1 to 8 and $R^2$ is hydrogen, hydroxy, amino, dialkylamino, —$COR^3$, or —$COOR^4$ wherein $R^3$ is hydrogen, chlorine, COC, $C_1$ to $C_8$ alkyl, aryl, COR, 2,4 dinitrophenyl, N-imido or $N_2$ and L is a direct bond or >C=0 and R is hydrogen or lower alkyl, and those disclosed in U.S. Pat. No. 5,451,343. The preferred fluorone derivative is 5,7-diiodo-3-butoxy-6-fluorone. The fluorone derivative sensitizer is mixed with an electron donating coinitiator, such as a tertiary amine to form the photoinitiator system. Triethanolamine has been found to enhance the photo-bleaching effect of the fluorone sensitizer.

After lateral seal 11 is installed, brim 12 sits along the interior surface of main pipeline 21 and will bond to previously installed lining 23. Tubular portion 13 extends a desired distance into lateral pipeline 22. This effectively seals what is generally considered to be a principal shortcoming in the lining of existing pipelines. In a relined sewer system with lateral seal 11 is installed after an opening 29 is cut in lining 23. Once seal 11 is installed, it will be more difficult for ground water at a remote fracture 31 from entering relined main pipeline 21 at opening 29. This is because opening 29 is generally formed using a remote cutting tool with a router bit or the like leaving a rough opening. This has created a long felt need for providing an effective lateral seal to seal the connection between a lateral pipe 22 and main pipeline 21.

Lateral seal 11 can be effectively installed utilizing an apparatus shown generally as 101 in FIG. 3. Apparatus 101 includes bladder cartridge 102 including an inflatable bladder 103 with a radially extending bladder arm 110 mounted on a substantially rigid bladder frame 104 having a base 131 and skeleton 139 between identical cup shaped proximal and distal end plates 105 with side wall sections 106. Bladder 103 is mounted to side wall sections 106 of end plates 105 by taping or banding 140. As illustrated in FIGS. 3 and 5, bladder frame 104 carrying bladder cartridge 102 is mounted in a delivery sled 107 equipped with a proximal positioning motor 108 and a separately operable distal lift motor 109 and a TV camera 111 mounted on a motor arm 112 by a spring 113.

Motor arm 112 is mounted on rack of a rack and pinion lift bar 114 which is operably coupled to proximal positioning motor 108. Proximal positioning motor 108 provides lift to lift bar 114 for elevating the proximal end of bladder cartridge 102 at a proximal lug 117 connection at proximal end plate 105 and also includes a rotational motor (not shown) for rotating motor arm 112 radially for positioning seal 11 at the entrance to lateral 22. Distal lift motor 109 also includes a lift arm 116 which includes a rack and pinion for lifting or lowering the distal end of bladder cartridge 102 by distal lug connection 117 at distal end plate 105.

Delivery sled 107 includes a base plate 118 for supporting motors 108 and 109. Base plate 118 is mounted on a pair of sled runners 119 at each end for displacement of apparatus 101 along the length of existing main pipeline 21 at the location of lateral 22. Positioning is facilitated by using TV camera 111 which is controlled remotely by a cable 120. TV camera 111 is mounted on spring 113 to permit displacement downward as lift motor 108 lifts bladder cartridge 102 into position adjacent to the opening to lateral 22.

Proximal end plate 105 includes at least one inlet port 126 which provides access to the interior of bladder cartridge 102 for providing a source of pressure to inflate bladder 103 and power a source of radiant energy in the interior of bladder 103 for initiating the cure of resin impregnated in impermeable layer 14 and 17 of seal 11. In the illustrated embodiment, pressure is provided by an air/vacuum hose 126' coupled to inlet port 126. A power line 127' is coupled to another inlet port 127 to provide power to a source of radiant energy within bladder 103. Corresponding ports 128 and 129 are provided in distal end plate 105. This is beneficial as it permits utilizing one port 128 to allow air to escape when the pressurized fluid is air. Alternately, water can also be expelled through distal output 129. However, this may not be wholly desirable since the portion of the main pipeline being lined is generally bypassed from the remainder of the pipe system. By providing comparable inlet and outlet ports on both proximal end plate 105 and distal end plate 105' bladder cartridge 102 can be inserted into delivery sled 107 in either direction. This greatly facilitates installation of laterals which intersect main pipeline 21 in opposed directions.

As pressurized air is applied to the interior of bladder 103, bladder arm 110 which was tucked within bladder 103 everts through the opening in brim 12 of seal 11 forcing tubular portion 13 of seal 11 to evert into lateral 22. Seal 11 is held in place as long as bladder 103 and arm 110 remain inflated. Generally air or water under pressure can be utilized to inflate bladder 103. When water is utilized and provides heat as the source of radiant energy for initiating the cure, an additional outlet 129 in distal plate 105 is used to permit the water to circulate.

When lateral seal 11 is positioned in place and bladder 103 is inflated, energy is applied to initiate cure of the resin. When the energy is visible light as in the embodiment of FIG. 5, cool air supplied by air hose 126' is circulated through bladder 103. This removes the heat generated by the exothermic cure reaction and the substantial heat generated by the halogen lamps as the visible light source. An adjustable pressure relief valve 125, such as a Nupro B-8CPA2 pressure relief valve which is adjustable between 3 to 50 psi with a ½ inch male thread is mounted in port 128. By inputting air at port 126 at about 20 psi through hose 126' and setting valve 125 at 4 psi, 4 psi pressure can be maintained in bladder 103 to keep it inflated.

At the completion of cure which can be as little as five minutes, a vacuum is drawn through air hose 126' now coupled to a vacuum pump to deflate bladder 103. Application of the vacuum to bladder 103 withdraws arm 110 from lateral 22 and causes it to deinvert into bladder 103. Withdrawal of arm 110 from within seal 11 is thus accomplished without use of a rope or other pulling mechanism which would otherwise present an opaque region and cast a shadow which would interfere with light projected into lateral 22 during the cure cycle.

Providing bladder cartridge 102 as a separate removable unit from delivery sled 107 results in several significant operational advantages. This allows loading of a second impregnated lateral seal 11 on a second bladder cartridge 102 as a first is being used to install and cure at one lateral location. As soon as the lateral connection being installed is completed, delivery sled 107 is removed from main pipeline 21, spent bladder cartridge 102 is removed and a second bladder cartridge 102 previously loaded with resin impregnated seal 11 is then inserted at both lug connections 117 and a second lateral installation can begin immediately. This is a significant time saving advantage. This is particularly true when a visible light cure resin is used as will be described in connection with the most preferred embodiment below.

Figure 4:
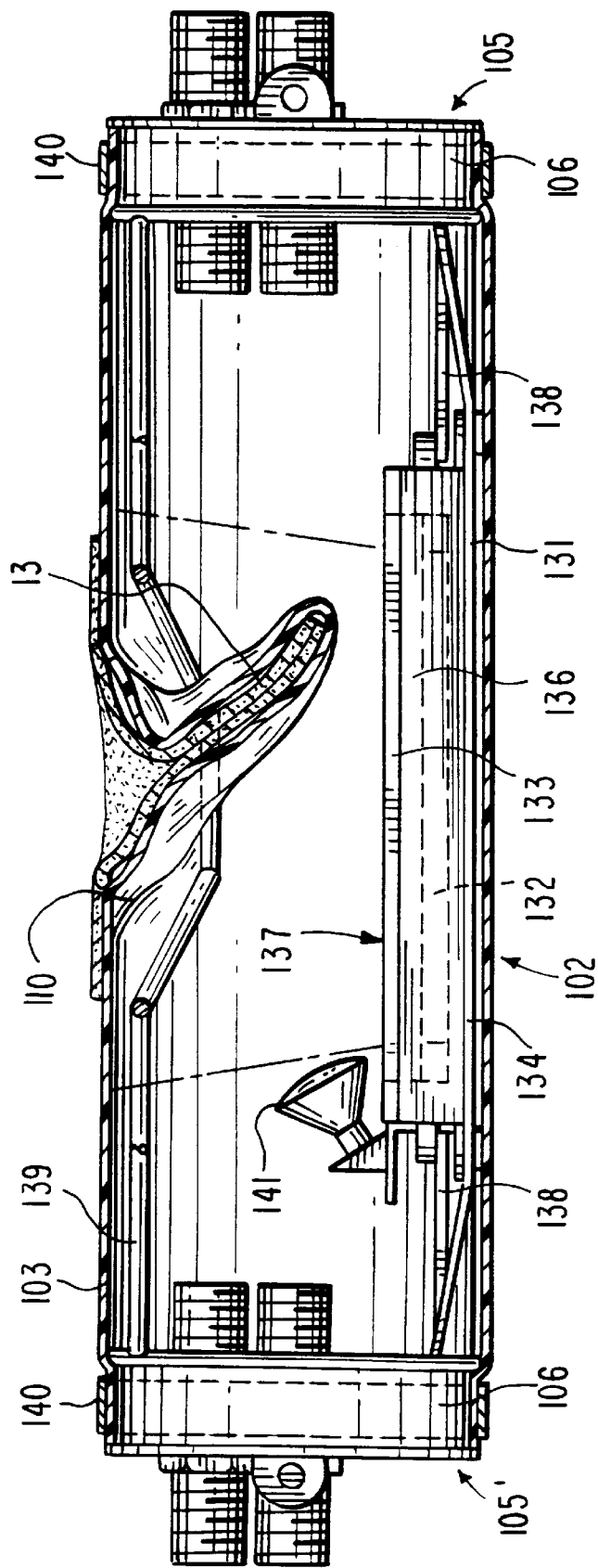
FIG. 4 is a cross-sectional view of a portion of the apparatus utilized to install the lateral seal of FIG. 1 in accordance with the invention.

A bladder cartridge 102 fully outfitted and loaded with seal 11 for use in a visible light lateral seal installation is shown in cross-section in FIG. 4 with tubular portion 13 tucked into recess formed by bladder 110 visible light lamps 132 are secured to base plate 131 of bladder cartridge 102. When a visible light cure system is utilized, lamps 132 emitting visible light within the range of about 400 to 600 nanometers are utilized. Lamps 132 are 1000 watt halogen lamps mounted with a substantially rectangular light box 133. Box 133 has a bottom 134, sidewalls 136 and a transparent glass top plate 137 with visible light lamps 132 positioned within light box 133. Matching electrical connections 138 are provided both ends of light box 133 so that bladder cartridge 102 may be inserted into delivery sled 107 in either direction as discussed above.

When installing lateral seal 11 in lateral pipeline 22, such as shown in FIG. 2 which intersects main pipeline 21 at a wye or angle, it is desirable and often necessary to provide sufficient light to extend into lateral pipeline 22 to insure that the resin in tubular section 13 is fully cured. In order to accomplish this, a secondary visible light emitting lamp 141 is provided at one end light box 133 projecting upwardly at an angle into the location of lateral 22. In this embodiment, a small 300 watt projector lamp 141 is aimed towards the dark or short side of wye fitting. The cavity between light box 133 and skeleton 139 at the opposite side of light box 133 remains free so that tubular portion 13 of lateral seal 11 can tucked within the interior of bladder frame 104 as seal 11 is loaded for installation.

Once inserted into main pipeline 21, sled runner 119 and 121 rest against lining 23 in main pipeline 21 as illustrated in FIG. 5. When in position at the entrance to lateral 22 and pressurized, bladder arm 110 everts through tubular portion 13 of seal 11 and extends into lateral 22 as shown in the cross-sectional view of FIG. 5 with secondary lamp 141 providing light to extend up into the dark or short distal region of tubular portion 13 which would otherwise not be illuminated by light emitted from light box 176 alone. Preferably, lamps 132 are 1000 watt halogen lamps having a tungsten halide filament. These lamps emit light rich in the 470 nanometer region.

A lateral seal 11 is installed in accordance with the invention as follows. Lateral seal 11 which has been impregnated with a curable resin is placed onto an apparatus including an inflatable bladder assembly having an inflatable arm which has been tucked inside the main portion of the bladder to form a recess. The lateral seal is placed on the bladder with the impermeable layer facing the bladder so that the resin impregnable material faces the interior of the main pipeline which typically has been relined. The tubular portion of the seal is then inverted into the arm recess of the bladder and placed within the cavity in the bladder assembly.

The bladder assembly with loaded seal is then placed into the main pipeline from an access opening typically remote from the location of the lateral intersection. The bladder assembly is then properly located at the lateral connection at the remote point with the bladder assembly located to face the resin impregnated portion of the brim at the lateral pipeline opening. The bladder is inflated to press the resin impregnated brim against the interior of the main pipeline and evert the arm with the bladder out through the opening in the brim. This everts the tubular portion of the seal into the entrance to the lateral pipeline. The inflation of the bladder is maintained as radiant energy generated from within the bladder is used to initiate the cure of the resin. The resin is then allowed to cure the source of radiant energy removed and the bladder deflated and removed from the mainline.

In the case when a visible light cure resin is utilized, the source of radiant energy within the bladder is visible light lamps. Power to generate the visible light is provided through the inlet ports in the bladder cartridge. When a visible light resin system is utilized and light in the wave length between 400 nm to 550 nm is used, an individual lateral seal can be fully installed and cured within less than one-half hour per seal. As one lateral seal is being installed and cured, a second lateral seal can be installed on a second bladder cartridge which can then be readily exchanged with the spent bladder cartridge on the delivery sled for the rapid deployment to the second lateral for installation and cure. Use of such a visible light cure technology has the advantage of using smaller, less expensive lighting systems, provides deeper curing depths with a faster curing speed.

It will thus be seen that the objects set forth above, among those made apparent from the preceding description, are efficiently attained and, since certain changes may be made in the above construction(s) without departing from the spirit and scope of the invention, it is intended that all matter contained in the above description or shown in the accompanying drawing(s) shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

I claim:
1. A method of installation of a resin impregnated cured in place lateral seal for lining the connection between a main pipeline and a lateral pipeline, wherein the lateral seal includes a brim portion and a tubular portion, each having an impermeable layer on one side thereof, comprising:

placing a lateral seal which has been impregnated with a curable resin on a first inflatable bladder assembly having a lined recess with an inflatable arm which when inflated extends radially from the bladder, the impermeable layer of the brim portion facing the expandable bladder and the tubular portion of the seal inverted into the arm which is retracted into the recess in the bladder;

releasably securing the bladder assembly with impregnated lateral seal onto a displaceable sled;

inserting the bladder assembly with loaded seal and displaceable sled into a main pipeline from an access opening;

locating the sled and bladder assembly at the lateral connection at a point remote to the access opening;

positioning the resin impregnated brim portion against the interior of the main pipeline at the connection with the lateral pipeline;

inflating the bladder to press the resin impregnated brim portion against the interior of the main pipeline and everting the arm of the bladder out through the opening in the brim portion to evert the tubular portion of the seal into the entrance to the lateral pipeline;

continuing to apply pressure to the bladder to press the brim portion against the main pipeline and the tubular portion against the lateral pipeline;

applying radiant energy from a source within the bladder assembly onto the resin impregnated seal to initiate the resin cure;

allowing the resin to cure;

placing a second impregnated lateral seal on a second bladder cartridge during the time the first seal is being positioned and cured;

ceasing to apply radiant energy;

deflating the bladder and extended arm in the first bladder assembly;

removing the sled and first bladder assembly from the access opening;

removing the first bladder assembly from the sled; and inserting the second bladder assembly with a second impregnated seal onto the sled for lining another connection between the main line and a lateral pipeline.

2. The method of installation of a lateral seal of claim 1, including curing the resin by applying visible light to initiate the cure of the resin.

3. The method of installation of a lateral seal of claim 2, further including the step of drawing a vacuum on the bladder after curing to deflate the bladder.

4. The method of installation of a lateral seal of claim 2, including the step of removing heat by circulating cooling air through the bladder assembly during curing.

5. The method of installation of a lateral seal of claim 1, including initiating the cure of the resin by applying light from within the bladder.

6. The method of installation of a lateral seal of claim 1, further including the step of drawing a vacuum on the bladder after curing to deflate the bladder.

7. The method of installation of a lateral seal of claim 1, including the step of removing heat by circulating cooling air through the bladder assembly during curing.

8. The method of installation of a lateral seal of claim 1, including the steps of installing a plurality of lateral seals successively.

* * * * *